(12) United States Patent
Masuda

(10) Patent No.: US 10,876,702 B2
(45) Date of Patent: Dec. 29, 2020

(54) DUAL LIGHT SOURCES HAVING SIMILAR SOLOR TEMPERATURES AND DIFFERENT SPECTRAL CHARACTERISTICS

(71) Applicant: KOITO MANUFACTURING CO., LTD., Tokyo (JP)

(72) Inventor: Takeshi Masuda, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 15/503,045

(22) PCT Filed: Aug. 12, 2015

(86) PCT No.: PCT/JP2015/072874
§ 371 (c)(1),
(2) Date: Feb. 10, 2017

(87) PCT Pub. No.: WO2016/024620
PCT Pub. Date: Feb. 18, 2016

(65) Prior Publication Data
US 2017/0236459 A1    Aug. 17, 2017

(30) Foreign Application Priority Data

Aug. 13, 2014   (JP) .................................. 2014-164757

(51) Int. Cl.
*F21S 43/00* (2018.01)
*G09F 19/20* (2006.01)
(Continued)

(52) U.S. Cl.
CPC ................ *F21S 43/00* (2018.01); *B60Q 1/04* (2013.01); *B60Q 1/2696* (2013.01); *B60Q 1/32* (2013.01);
(Continued)

(58) Field of Classification Search
CPC ........ F21S 48/215; F21S 48/234; G09F 13/02
See application file for complete search history.

(56) References Cited

U.S. PATENT DOCUMENTS

| 4,821,154 A * | 4/1989 | Kotecki ................. F21V 19/04 362/20 |
| 2009/0214193 A1* | 8/2009 | Suzuki .............. H01L 21/67115 392/411 |

(Continued)

FOREIGN PATENT DOCUMENTS

| CN | 103403442 A | 11/2013 |
| JP | 2000-54325 A | 2/2000 |

(Continued)

OTHER PUBLICATIONS

Digre, Kathleen B, and K C Brennan. "Shedding light on photophobia." Journal of neuro-ophthalmology : the official journal of the North American Neuro-Ophthalmology Society vol. 32,1 (2012): 68-81. doi:10.1097/WNO.0b013e3182474548 (Year: 2013).*

(Continued)

*Primary Examiner* — Gerald J Sufleta, II
(74) *Attorney, Agent, or Firm* — Sughrue Mion, PLLC

(57) ABSTRACT

This lighting device (1) is provided with a first light source (L1) and a second light source (L2). The first light source (L1) emits a first light. The second light source (L2) emits a second light. The first light and the second light have substantially the same color temperature but different spectral characteristics. This lighting device (1) is configured such that the first light and the second light are alternately irradiated onto a road sign (2).

8 Claims, 7 Drawing Sheets

(51) Int. Cl.

| | |
|---|---|
| *H05B 47/10* | (2020.01) |
| *F21S 43/14* | (2018.01) |
| *F21S 43/31* | (2018.01) |
| *B60Q 1/04* | (2006.01) |
| *B60Q 1/26* | (2006.01) |
| *B60Q 1/32* | (2006.01) |
| *F21S 8/08* | (2006.01) |
| *F21V 3/00* | (2015.01) |
| *F21V 7/04* | (2006.01) |
| *F21V 23/00* | (2015.01) |
| *F21V 23/04* | (2006.01) |
| *G09F 13/00* | (2006.01) |
| *G09F 13/02* | (2006.01) |
| *F21Y 115/10* | (2016.01) |

(52) U.S. Cl.
CPC ............... *F21S 8/086* (2013.01); *F21S 43/14* (2018.01); *F21S 43/31* (2018.01); *F21V 3/00* (2013.01); *F21V 7/04* (2013.01); *F21V 23/003* (2013.01); *F21V 23/0407* (2013.01); *G09F 13/005* (2013.01); *G09F 13/02* (2013.01); *G09F 19/205* (2013.01); *H05B 47/10* (2020.01); *B60Q 2400/20* (2013.01); *F21Y 2115/10* (2016.08)

(56) References Cited

U.S. PATENT DOCUMENTS

| | | | | |
|---|---|---|---|---|
| 2009/0320340 | A1* | 12/2009 | Koren | G09F 13/22 40/544 |
| 2012/0299476 | A1* | 11/2012 | Roberts | B60Q 1/2607 315/77 |
| 2013/0127340 | A1* | 5/2013 | Huhn | B60Q 1/0041 315/77 |
| 2013/0187568 | A1* | 7/2013 | Jelaca | H05B 47/185 315/297 |
| 2013/0208467 | A1* | 8/2013 | Park | F21K 9/60 362/235 |
| 2014/0066722 | A1 | 3/2014 | Marka et al. | |
| 2014/0071407 | A1* | 3/2014 | Takahashi | G03B 21/142 353/31 |
| 2015/0009673 | A1* | 1/2015 | Wu | F21K 9/64 362/293 |
| 2015/0055360 | A1* | 2/2015 | Hollingworth | B60Q 1/50 362/511 |
| 2015/0145698 | A1* | 5/2015 | Werner | G08G 1/0112 340/928 |

FOREIGN PATENT DOCUMENTS

| | | |
|---|---|---|
| JP | 2002169493 A | 6/2002 |
| JP | 2007-182214 A | 7/2007 |
| JP | 2008-096902 A | 4/2008 |
| JP | 2008282755 A * | 11/2008 |
| JP | 2009-295472 A | 12/2009 |
| JP | 2011-136651 A | 7/2011 |
| JP | 2011-212011 A | 10/2011 |
| JP | 2013139685 A | 7/2013 |
| JP | 2013-196976 A | 9/2013 |
| JP | 201426837 A | 2/2014 |
| JP | 201484679 A | 5/2014 |
| WO | 2013/150297 A1 | 10/2013 |

OTHER PUBLICATIONS

International Search Report dated Nov. 2, 2015, issued by the International Searching Authority in counterpart International Application No. PCT/JP2015/072874 (PCT/ISA/210).

Written Opinion dated Nov. 2, 2015, issued by the International Searching Authority in counterpart International Application No. PCT/JP2015/072874 (PCT/ISA/237).

Communication dated May 17, 2018, issued by the State Intellectual Property Office of the People's Republic of China in counterpart Chinese Patent Application 201580043086.9.

Communication dated May 8, 2018, issued by the Japanese Patent Office in counterpart Japanese Patent Application 2014-164757.

Communication dated Nov. 27, 2018, issued by the Japanese Patent Office in counterpart Japanese Patent Application No. 2014-164757.

Communication dated Jul. 2, 2019 issued by the Japanese Patent Office in counterpart Japanese Application No. 2014-164757.

* cited by examiner

DUAL LIGHT SOURCES HAVING SIMILAR SOLOR TEMPERATURES AND DIFFERENT SPECTRAL CHARACTERISTICS

TECHNICAL FIELD

The present invention relates to a lighting device and a lighting system for illuminating an object and, particularly, to a lighting device and a lighting system capable of improving visibility (ease of visual confirmation) and visual attractiveness (ease of visual attention) for an illumination object.

BACKGROUND ART

For road signs, various studies have been made in order to improve visibility and visual attractiveness of the signs. For example, a lighting device for illuminating a sign surface has been incorporated into a sign. In the configuration disclosed in Patent Document 1, a plurality of LEDs (light-emitting elements) is arranged along the sign surface of the road sign and the visibility and visual attractiveness of the sign are enhanced by controlling the turn on/off of these LEDs. In the configuration disclosed in Patent Document 2, a sign surface is configured by a light reflection sheet and an LED is also provided. When the visibility and visual attractiveness are not sufficient just by the light reflection sheet, the LED is turned on.

CITATION LIST

Patent Document

Patent Document 1: Japanese Patent Laid-Open Publication No. 2014-84679
Patent Document 2: Japanese Patent Laid-Open Publication No. 2013-139685

DISCLOSURE OF INVENTION

Problems to be Solved by Invention

In the signs disclosed in Patent Documents 1 and 2, an LED is turned on to illuminate the sign surface, thereby increasing the visibility and visual attractiveness. In order to further increase the visibility and visual attractiveness, it is desirable to cause the LED to blink. That is, the sign surface to be illuminated by the LED is changed to the bright or dark by causing the LED to blink, and thus, especially the visual attractiveness is improved.

However, in the case of just causing the LED to blink, the sign surface is in the state of being not illuminated at the timing when the LED is turned off. In this state, the visibility and visual attractiveness of the sign are decreased. In order to avoid this situation, it is required to display the corresponding sign pattern in a blinking state by providing a plurality of LEDs to correspond to the sign pattern of the sign surface and causing only some of the LEDs to blink. Therefore, in the conventional sign, a plurality of LEDs is integrally incorporated into the sign, as disclosed in Patent Documents 1 and 2. Thus, the structure of each sign becomes complicated, which is one factor of the cost increase.

The present invention aims to improve the visibility and visual attractiveness of an illumination object while suppressing an increase in cost.

Means for Solving the Problems

In order to achieve the above object, a first aspect of the present invention provides a lighting device including a first light source configured to emit a first light and a second light source configured to emit a second light, wherein the first light and the second light have substantially the same color temperature but different spectral characteristics, and wherein the lighting device is configured such that the first light and the second light are alternately irradiated to an illumination object.

According to this configuration, although the illumination object is alternately illuminated by the first light and the second light, the same visibility as the case where the illumination object is illuminated in constant brightness is obtained since the color temperature of both lights is substantially the same. On the other hand, since the spectral characteristics of both lights are different, the color portions of the wavelength region in which the spectral characteristics are different are present on the illumination object and the luminous intensity of the reflected light or transmitted light thereof are different. Accordingly, the brightness to be visually recognized is changed to follow the alternate lighting of both light sources, and thus, the color portions appear to blink. In this way, the visibility of the illumination object is improved and the visual attractiveness for the illumination object is also improved. Further, since it is not necessary to integrally incorporate a special light source into the illumination object itself, it is possible to suppress an increase in cost of providing the illumination object.

The lighting device may include a lighting control unit for alternately lighting the first light source and the second light source.

The lighting device may be configured such that the luminous intensities of the first light and the second light are equal. Here, "luminous intensity" may be replaced with "illuminance" at the illumination object.

The lighting device may be mounted on a vehicle and may be configured such that the first light and the second light are irradiated to at least the front of the vehicle.

In order to achieve the above object, a second aspect of the present invention provides a lighting system including the lighting device according to the first aspect and an illumination object that has portions exhibiting the colors of wavelength region of which the spectral characteristics are different.

The lighting device may be fixed to the illumination object.

EMBODIMENT

Figure 1A:
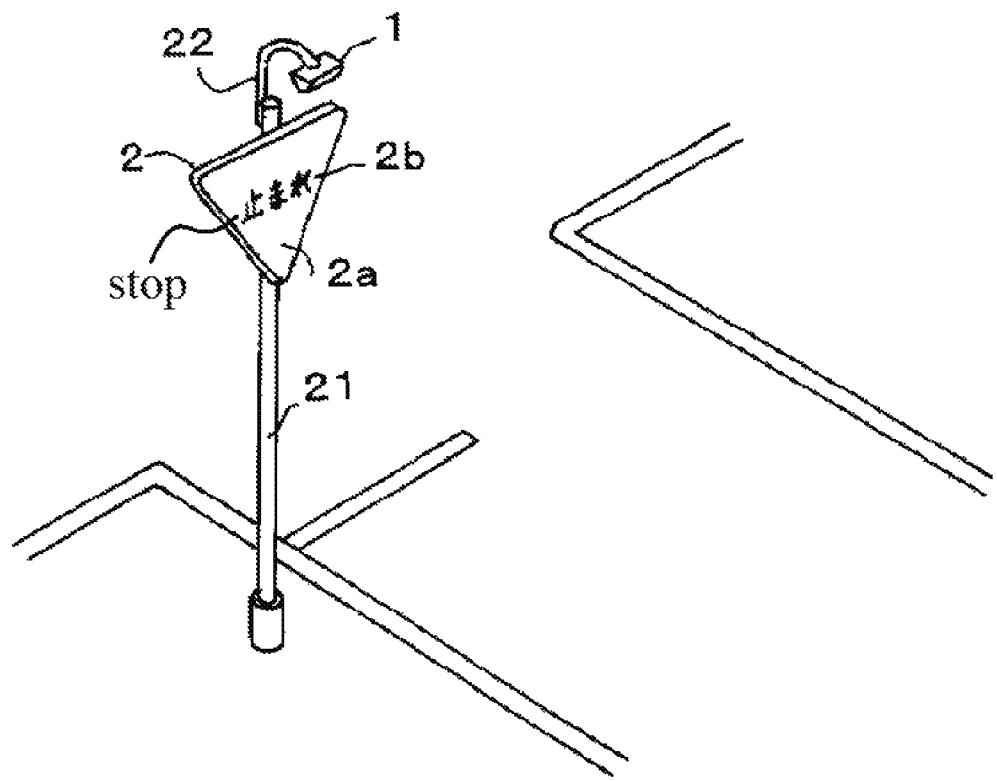
FIGS. 1A and 1B are views showing a lighting system according a first embodiment.

Hereinafter, an embodiment will be described with reference to the accompanying drawings. FIG. 1A shows a lighting system according to a first embodiment. The lighting system has a lighting device 1 and a road sign 2 (an example of an illumination object). The road sign 2 is disposed on the side of a T-shaped intersection. Here, a temporary stop sign is illustrated as the road sign 2. A sign pattern 2b in which a white character called "stop" is provided on a red background is described on a sign surface 2a of a triangular sign board. The road sign 2 is fixedly supported on an upper end portion of a strut 21 erected on a ground. A support arm 22 is connected to the upper end portion of the strut 21. The lighting device 1 is supported on a leading end of the support arm 22 in such a way that an optical axis of the lighting device 1 is directed downward. When this lighting device 1 is turned on, the light emitted from the lighting device 1 illuminates the sign surface 2a of the sign board 2.

Figure 1B:
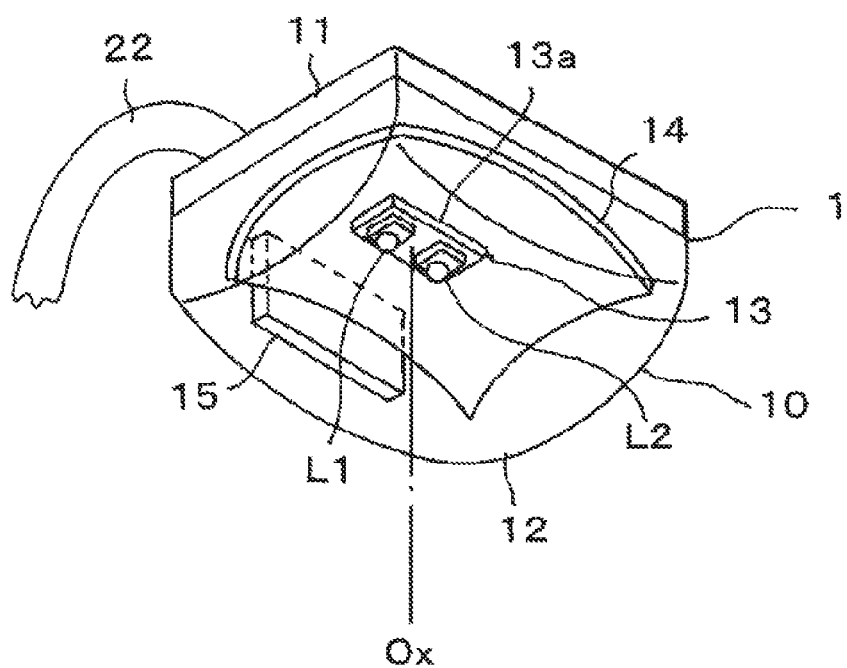

FIG. 1B is a schematic configuration view of the lighting device 1. An optical axis Ox of the lighting device 1 is directed in a vertical direction. A translucent lens 12 made of a transparent resin board is assembled to an opening portion of a body 11, thereby constituting a casing 10. The body 11 is fixedly supported on a leading end of the support arm 22 shown in FIG. 1A. A light source unit 13, a reflector 14 and a lighting control circuit 15 (an example of a lighting control unit) are accommodated in the interior of the casing 10.

The light source unit 13 includes a first light source L1 and a second light source L2. The first light source L1 and the second light source L2 are mounted on a unit substrate 13a. The unit substrate 13a is supported on the reflector 14 which has a desired reflection surface shape. The first and second light sources L1, L2 are disposed in the state where respective light-emitting surfaces are directed to the optical axis Ox of the lighting device 1 and in the position where they are adjacent to each other so as to sandwich the optical axis Ox.

The first light source L1 includes a RGB full-color LED. The second light source L2 includes a blue-yellow-based pseudo-white LED. Structures of these LEDs are already known and thus are not shown. The first light source L1 is configured as an integrated module of three LEDs for emitting blue light, green light and red light, respectively. When three LEDs are turned on, the blue light, the green light and the red light are combined, thereby emitting white light (an example of the first light).

The second light source L2 includes a blue LED for emitting blue light and a yellow phosphor for emitting yellow light by being excited by the light emitted from the blue LED. The blue LED and the yellow phosphor are configured as an integrated module. When the blue LED is turned on, the blue light and the yellow light emitted from the yellow phosphor are combined, thereby emitting white light (an example of the second light).

The light emitted from the first light source L1 and the light emitted from the second light source L2 are respectively reflected by the reflector 14, then transmitted through the translucent lens 12, and then irradiated to the front region along the optical axis Ox. In this way, the sign surface 2a of the sign device 2 is illuminated. That is, by properly designing the shape of the reflector 14 and the configuration of the translucent lens 12, the light-distribution of the light emitted from the first light source L1 and the light emitted from the second light source L2 is controlled to respectively illuminate the entire region of the sign surface 2a.

The first and second light sources L1, L2 is configured such that the lighting thereof is independently controlled respectively by the lighting control circuit 15. The lighting control circuit 15 is connected to a commercial power supply by a power feeding cable (not shown). When a signal to turn on the lighting device 1 is inputted, the lighting control circuit 15 controls the lighting of the first and second light sources L1, L2. Alternatively, the lighting control circuit 15 can be configured to control the lighting of each of the first and second light sources L1, L2 by using a photovoltaic solar cell or a storage battery as a power supply.

Figure 2A:
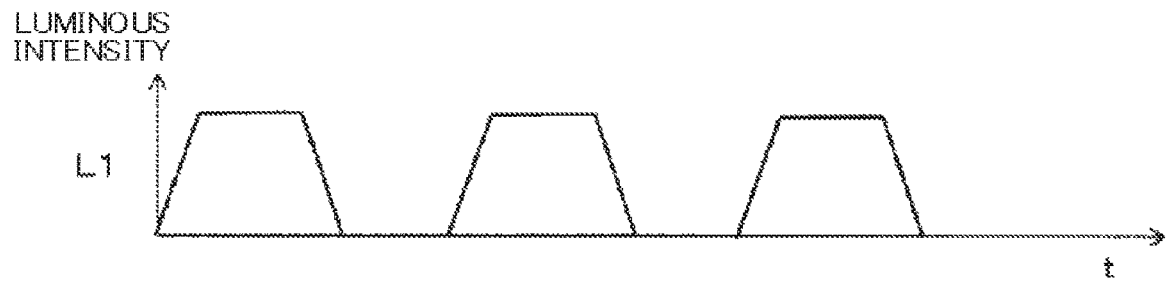
FIGS. 2A to 2C are views showing the lighting timing of first and second light sources which are parts of the lighting device.
Figure 2B:
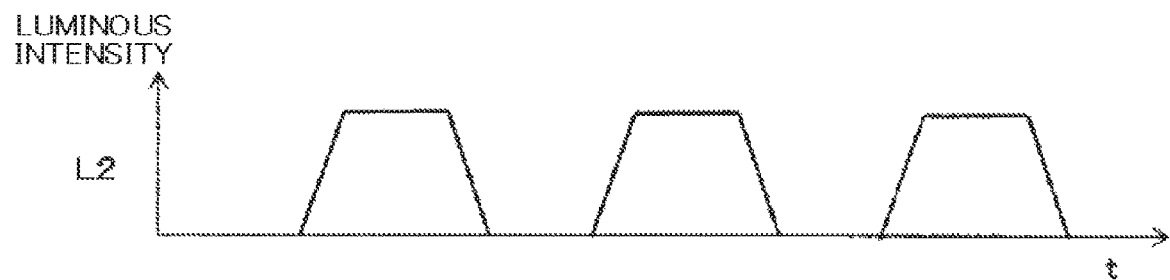

FIG. 2 is a time chart for controlling the lighting of the first and second light sources L1, L2 by the lighting control circuit 15. As shown in FIGS. 2A and 2B, the lighting control circuit 15 is adapted to alternately turn on the first and second light sources L1, L2. That is, the lighting control circuit 15 turns off the second light source L2 at the time of turning on the first light source L1 and turns off the first light source L1 at the time of turning on the second light source L2. The frequency in the alternate lighting control is set to a range of 2 to 4 Hz in which human beings can visually recognize the turn on/off of each light source, preferably about 2 Hz. Further, the luminous intensity of both light sources L1, L2 is set to be equal.

Figure 3A:
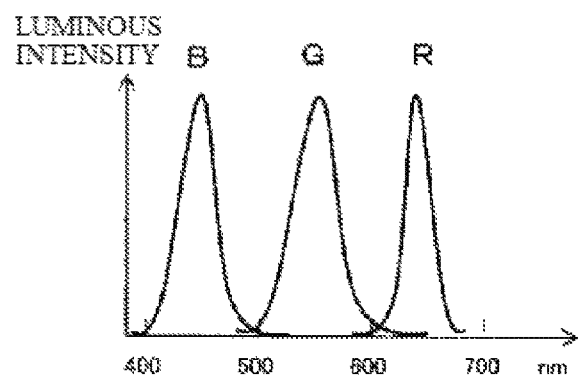
FIGS. 3A to 3E are views showing the spectral characteristics of the first and second light sources, the reflection characteristics of a sign pattern, and the reflection characteristics of the sign pattern by the first and second light sources.
Figure 3B:
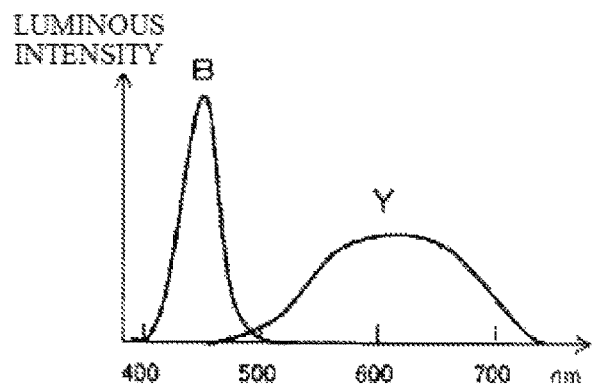

As described above, the first light source L1 includes the RGB full-color LED and the second light source L2 includes the blue-yellow-based pseudo-white LED. Therefore, the light emitted from the first light source L1 and the light emitted from the second light source L2 have substantially the same color temperature but different spectral distribution, respectively. As shown in FIG. 3A, in the spectral distribution characteristics of the first light source L1, respective luminous intensity levels in each of wavelength regions of the blue B, the green G and the red R are high. The color temperature of the combined white light is approximately 5000K (Kelvin). On the other hand, as shown in FIG. 3B, in the spectral distribution characteristics of the second light source L2, the luminous intensity level in the blue B is high and the luminous intensity level in the yellow Y, i.e., in the wavelength region from the green to the red, is low. The color temperature of the combined white light is 5000K which is substantially the same as the first light source.

In the temporary stop sign 2 shown in FIG. 1, the lighting control circuit 15 turns on the first and second light sources L1, L2 under the situation that the visibility of the sign surface 2a is low. At this time, the first light source L1 and the second light source L2 are alternately turned on, as described above. Therefore, the sign surface 2a is illuminated by the irradiation light of the first light source L1 and the irradiation light of the second light source L2, alternately.

In the sign surface 2a, the white sign pattern 2b is formed on the red background, as described above. In the white sign pattern 2b, the color temperature of both light sources L1, L2 is substantially the same even when the white sign pattern 2b is alternately illuminated by the irradiation light of the first light source L1 and the irradiation light of the second light source L2. Therefore, the white sign pattern 2b is seen as a visually almost identical white color That is, the white sign pattern 2b is seen as a white color whose brightness is not substantially changed, irrespective of the alternate lighting of the first light source L1 and the second light source L2.

Here, the expression "the color temperature is substantially the same" means that a color temperature difference is allowed in which a desired brightness of an illumination object appears not to be changed even by the alternate lighting of the first light source L1 and the second light source L2.

Figure 3C:
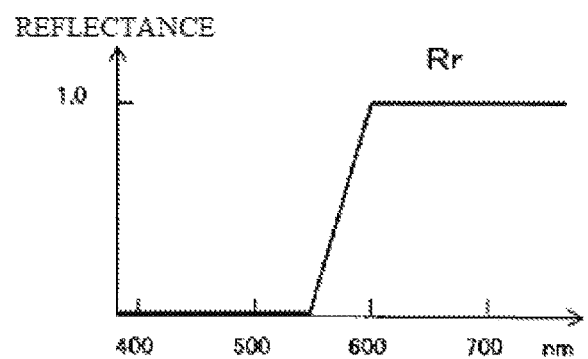
Figure 3D:
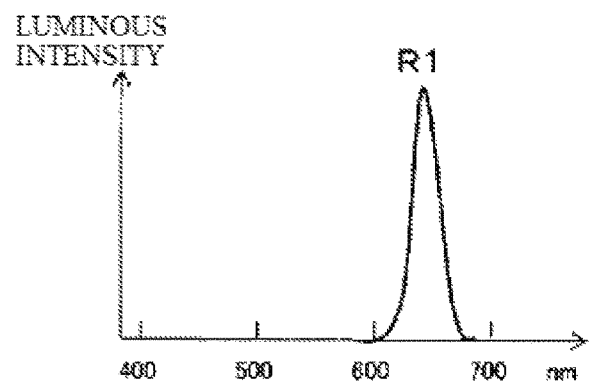
Figure 3E:
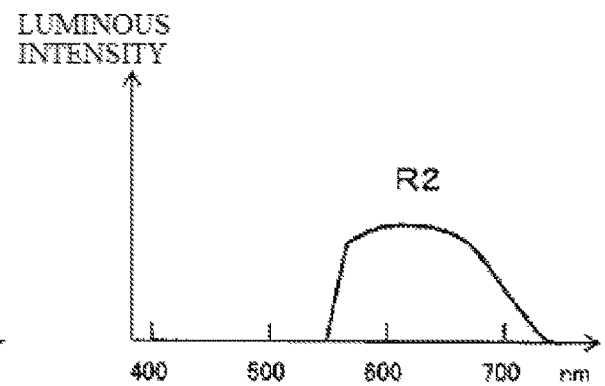

On the other hand, the red background of the sign surface 2a has light-reflection characteristics shown in FIG. 3C. Specifically, as indicated by characteristics Rr, the reflectance in the red wavelength region is high and the reflectance in the wavelength region shorter than the red wavelength region is almost close to zero. Therefore, when illuminated by the first light source L1 having the spectral distribution characteristics shown in FIG. 3A, the reflection luminous-intensity characteristics of the red background become luminous-intensity characteristics R1 shown in FIG. 3D. On the other hand, when illuminated by the second light source L2 having the spectral distribution characteristics shown in FIG. 3B, the reflection luminous-intensity characteristics of the red background become luminous-intensity characteristics R2 shown in FIG. 3E. Comparing these characteristics R1, R2 shown in FIGS. 3D and 3E, it can be seen that the light reflection luminous-intensity of the red background when illuminated by the first light source L1 is relatively high but the light reflection luminous-intensity of the red background when illuminated by the second light source L2 is relatively low.

Figure 2C:
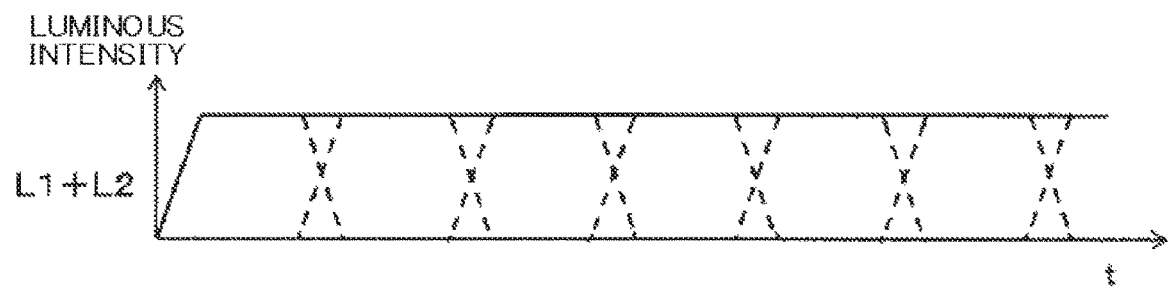
Figure 4A:
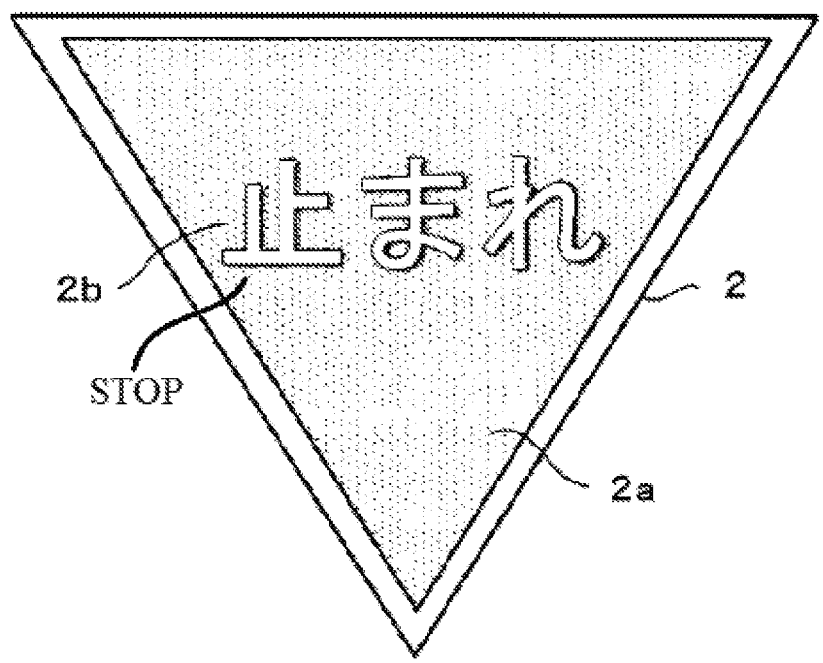
FIGS. 4A and 4B are views showing a change in an outer appearance of a sign surface illuminated by the lighting device.
Figure 4B:
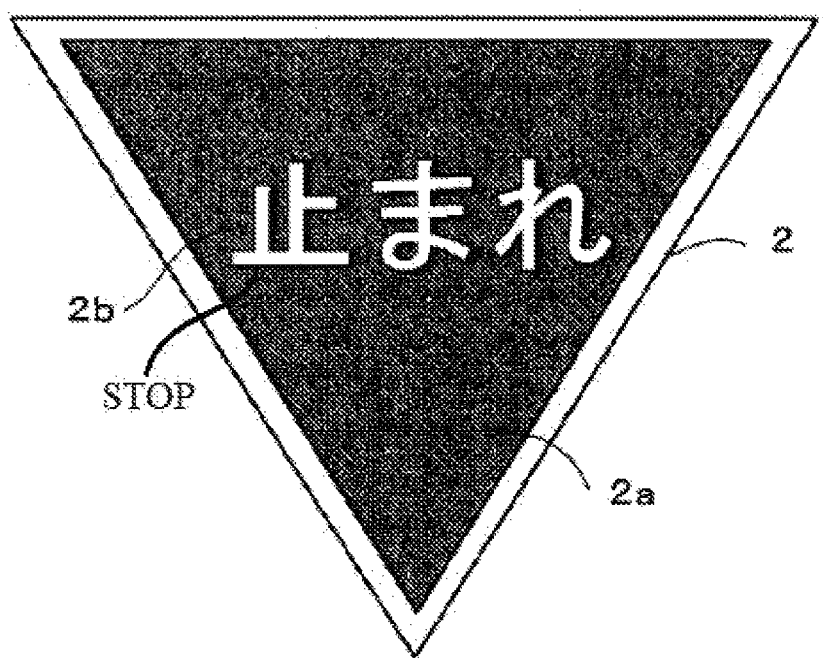

Therefore, as schematically shown in FIGS. 4A and 4B, the white sign pattern 2a is observed as a white sign pattern having a substantially constant brightness when the sign surface 2a is alternately illuminated by the first light source L1 and the second light source L2. Especially in this embodiment, as shown in FIG. 2C, the first light source L1 and the second light source L2 are alternately turned on in the same luminous intensity. Further, the luminous-intensity ascending curve when one of the light sources is turned on and the luminous-intensity descending curve when the other thereof is turned off are intersected approximately at the central luminous-intensity value. Therefore, even when light is emitted from both light sources at the switching timing of the alternate lighting, the combined luminous intensity substantially coincides with the luminous intensity at the time of the turn-on. In this way, it is possible to suppress a change in brightness of the white sign pattern even at the switching timing.

On the other hand, for the red background of the sign surface 2a, a bright red and a dark red are alternately observed when the first light source L1 and the second light source L2 are alternately turned on. In FIGS. 4A and 4B, a thin depiction represents a bright red and a dark depiction represents a dark red. FIG. 4A shows the sign surface 2a when the first light source L1 is turned on. As described with reference to FIG. 3D, the white sign pattern 2b is observed as a bright white and the red background is observed as a bright red. FIG. 4B shows the sign surface 2a when the second light source L2 is turned on. The white sign pattern 2b is observed as a bright white but the red background is observed as a dark red. As a result, in the case where the temporary stop sign 2 is illuminated by the lighting device 1, the white character called "stop" is continuously observed as a bright white and the red background around the white character is alternately observed as a bright red and a dark red. Consequently, the red background portion of the temporary stop sign 2 appears to blink.

With this blinking, the visual attractiveness of the sign surface 2a of the temporary stop sign 2 for a driver of a motor vehicle, for example, is improved. On the other hand, since the white sign pattern 2b of "stop" of the temporary stop sign has an appearance that is not changed over time, the visibility for the driver can be ensured and further improved. That is, unlike the conventional blink-type sign, there is no possibility that the sign is difficult to be visually recognized when the illumination is turned off.

Further, in terms of the temporary stop sign 2, the sign that has been conventionally provided is used as it is. The lighting device 1 is sufficient for illuminating the sign surface 2a of the stop sign 2. Therefore, this is advantageous in suppressing an increase in cost of providing the sign. That is, unlike the structures disclosed in Patent Documents 1 and 2, there is no need to integrally incorporate a dedicated light source into the individual sign. Further, when the colors constituting the sign surface are almost the same (e.g., red in the present embodiment), the same lighting device can be also used for signs having different sign patterns, thereby improving the visibility and visual attractiveness.

Figure 5A:
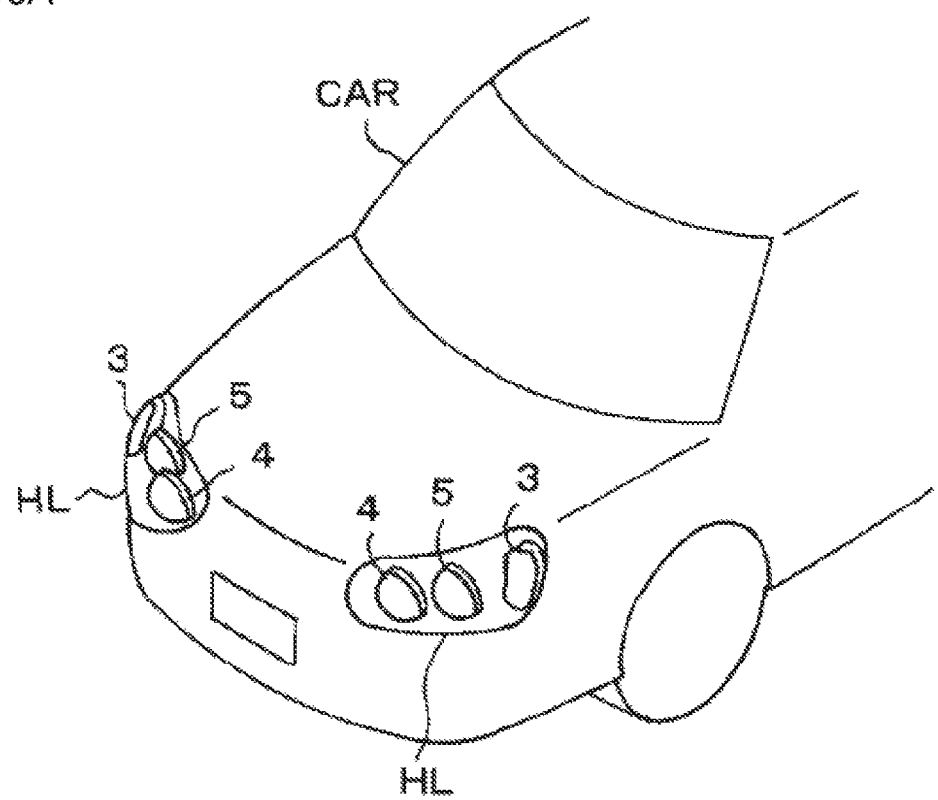
FIGS. 5A and 5B are views showing a lighting device according to a second embodiment.

FIG. 5A is a conceptual view showing an example where a lighting device according to a second embodiment is applied to a clearance lamp of a motor vehicle. A combination type headlamp HL is arranged on the left and right of a front portion of a vehicle body of a motor vehicle CAR, respectively. A clearance lamp 3 is accommodated in the combination type headlamp. That is, the clearance lamp 3 is accommodated, together with a high beam lamp 4 and a low beam lamp 5, in a lamp housing of the combination type headlamp HL.

Figure 5B:
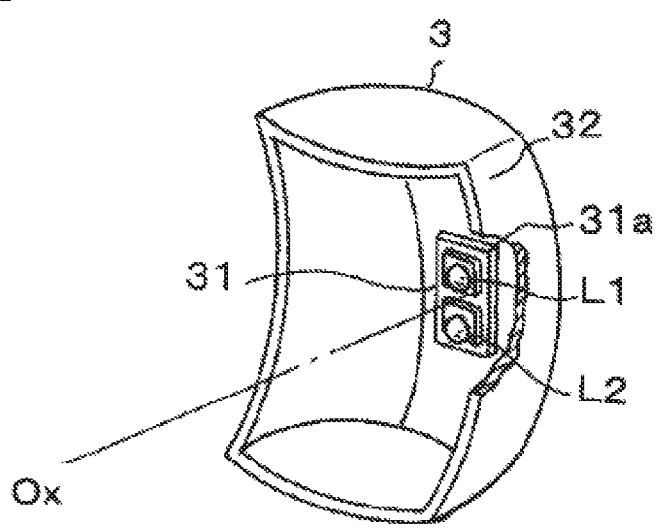

FIG. 5B shows the clearance lamp 3 in a state of being partially broken. The clearance lamp 3 includes a light source unit 31. The light source unit 31 includes a unit substrate 31a. The first light source L1 and the second light source L2 are disposed on the unit substrate 31a in such a way that respective light-emitting surfaces are directed in a direction along the optical axis Ox. The unit substrate 31a is disposed approximately at a focal point position of a reflective surface of a reflector 32 basically formed of a parabolic surface. In this way, when the first and second light sources L1, L2 are turned on, the light emitted from each of the light sources L1, L2 is reflected by the reflector 32 and irradiated in a required light distribution toward the front of the motor vehicle CAR.

The first light source L1 includes the RGB full-color LED. The second light source L2 includes the blue-yellow-based pseudo-white LED. These light sources L1, L2 are the same as those described with reference to the first embodiment and the spectral characteristics of respective light sources L1, L2 are also the same as those shown in FIGS. 3A and 3B. The first and second light sources L1, L2 are connected to a lighting control circuit (not shown), respectively. The first and second light sources L1, L2 are alternately turned on by the lighting control circuit, based on the timing shown in FIG. 2. Meanwhile, the lighting control circuit may be formed as an independent circuit or may be configured integrally with a lighting control circuit for controlling the lighting of a high beam lamp HiL or a low beam lamp LoL.

In this embodiment, when the clearance lamp 3 is turned on by the lighting control circuit during the driving at night, the first light source L1 and the second light source L2 are alternately turned on, based on the timing shown in FIG. 2. Since the color temperature of the white light from both light sources is substantially the same even when the first and second light sources L1, L2 are alternately turned on, the front region of the motor vehicle CAR, especially the regions other than road signs, such as road surfaces, are illuminated by the white light which has a substantially constant luminous intensity, irrespective of the alternate lighting of the light sources. Therefore, the same illumination as the conventional clearance lamp is performed, and thus, the visibility for the front region of the motor vehicle is ensured.

On the other hand, in terms of the illumination of road signs, especially when sign patterns composed of the colors of the yellow to red wavelength region in which the spectral characteristics of the first light source L1 and the second light source L2 are different are irradiated by the light emitted from the clearance lamp 3, the sign patterns of the above colors appear to blink. For example, when the temporary stop sign 2 shown in FIG. 1 is illuminated, the region of the red background of the sign surface 2a appears to blink. Therefore, even when, as shown in FIG. 1, the temporary stop sign 2 is not equipped with a dedicated lighting device 1, the visual attractiveness of the temporary stop sign 2 is improved by the illumination of the clearance lamp 3.

Figure 6:
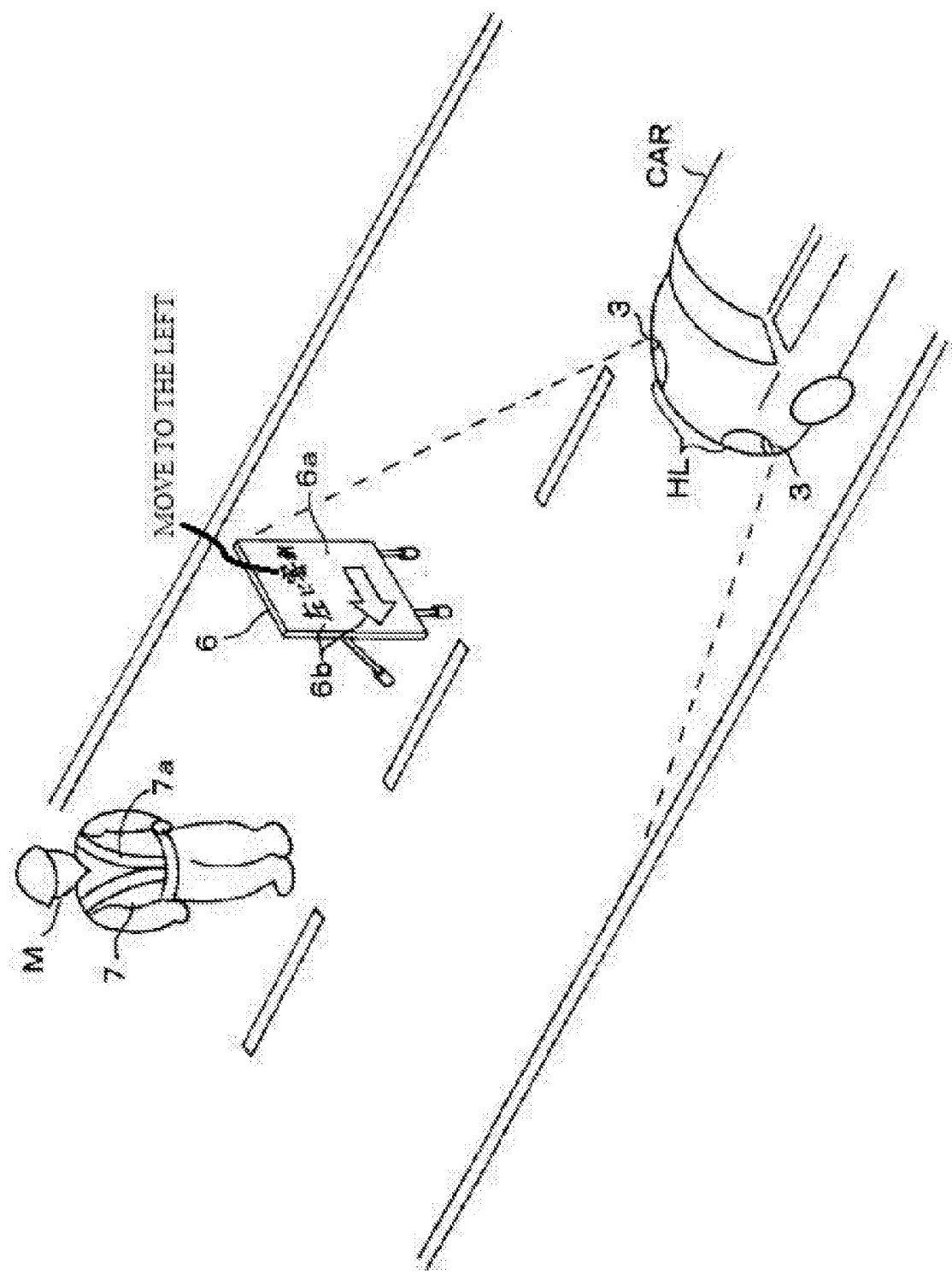
FIG. 6 is a view showing an illumination object according to the second embodiment.
Figure 7A:
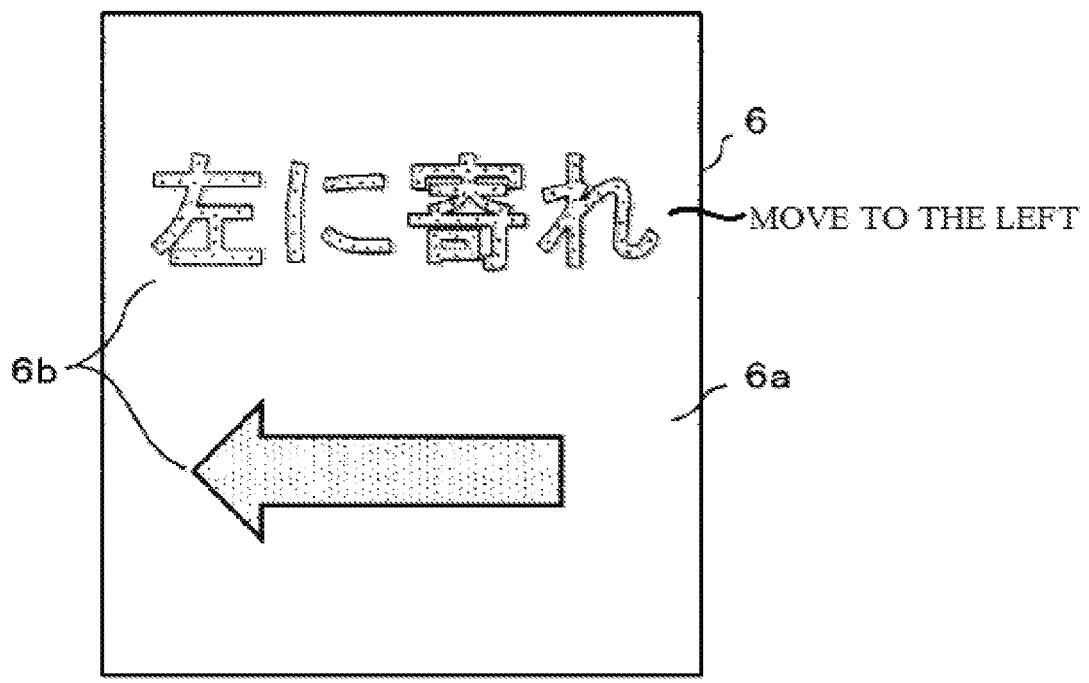
FIGS. 7A and 7B are views showing a change in an outer appearance of the illumination object, which is illuminated by the lighting device shown in FIG. 5.
Figure 7B:
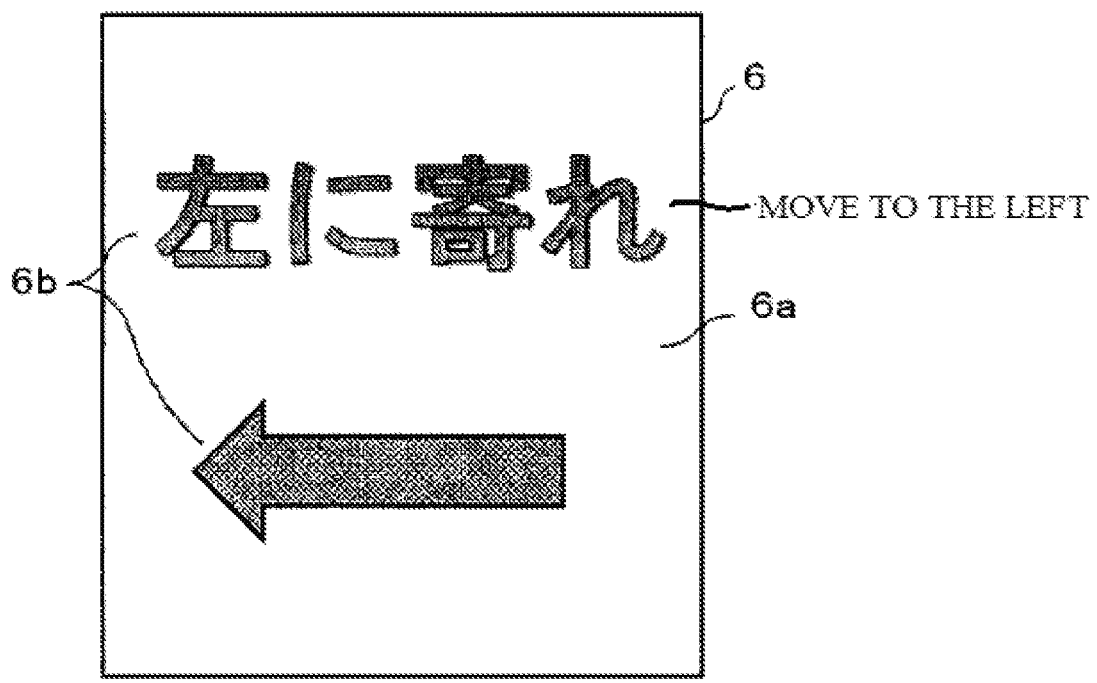

Further, in the present embodiment, for example, when, as shown in FIG. 6, a vehicle-lane restriction sign 6 is provided in front of the motor vehicle CAR, the visibility and visual attractiveness thereof can be improved. In this vehicle-lane restriction sign 6, a red sign pattern 6b of "move to the left" and "left arrow" is herein displayed on a rectangular display surface 6a whose background is white. The reflection characteristics of this red sign pattern 6b are the same as those shown in FIG. 3C.

When this vehicle-lane restriction sign 6 is illuminated by the light emitted from the clearance lamp 3, the display surface 6a of the white background is visually recognized as a white color whose brightness is not substantially changed over time, irrespective of the alternate lighting of the first light source L1 and the second light source L2, since the color temperature of both light sources L1, L2 is substantially the same. On the other hand, the red sign pattern 6b of "move to the left" and "left arrow" is visually recognized as a bright red and a dark red alternately in accordance with the alternate lighting of both light sources L1, L2 by the spectral luminous-intensity difference in the red wavelength region of the first light source L1 and the second light source L2. As a result, the sign pattern 6b appears to blink, and thus, the visibility and visual attractiveness thereof are improved.

Further, in the present embodiment, the first light source L1 and the second light source L2 of the clearance lamp 3 have different spectral luminous intensity in the yellow to red wavelength region. Therefore, as shown in FIG. 6, when a night worker M wearing a safety vest 7 is present on road and a sash portion 7a of the safety vest 7 exhibits a yellow-green-based fluorescent color, the yell-green color of the sash portion 7a appears to blink in accordance with the alternate lighting of the first light source L1 and the second light source L2. Therefore, the visibility and visual attractiveness of the vehicle driver to the night worker are improved.

According to the present embodiment, in terms of the sign 6 or the night worker (safety vest) 7, there is no need to integrally incorporate a light source for causing the sign pattern or the safety vest to blink. Therefore, this is advantageous in suppressing an increase in cost of providing the sign or the safety vest.

The foregoing description is provided for the purpose of facilitating the understanding of the present invention but is not intended to limit the present invention. It is obvious that the present invention can be changed and modified without departing from the spirit thereof and the equivalents are included in the present invention.

The above-described lighting device is not limited to the clearance lamp of the present embodiment but may be applied to another auxiliary lamp such as an overhead lamp. Alternatively, the above-described lighting device may be applied to a low-beam lamp or a high-beam lamp.

In the foregoing embodiment, the sign surface to be illuminated by the lighting device is configured as a light reflecting surface. However, the above-described lighting device can be also applied to a sign where a sign surface is configured as a light transmitting surface. As such light transmitting type signs, various ones have already been proposed. For example, a light-transmittable color film may be formed as a sign pattern or a sign surface background on the surface of a light-transmittable substrate.

In the case of such light transmitting type sign, the above-described lighting device is provided on a back side of the sign surface, and the light emitted from this lighting device is transmitted through the sign surface. Then, the first light source and the second light source are alternately turned on. When the first light source is turned on, color light with high luminous intensity is transmitted through the sign pattern and displayed as a bright color. When the second light source is turned on, the color light is visually recognized as a dark color since it has relatively low luminous intensity. As a result, the color sign pattern appears to blink, and thus, the visual attractiveness is improved.

On the other hand, the white-based sign surface is visually recognized as a white-based color whose brightness is substantially constant over time, irrespective of the alternate lighting of the first light source and the second light source. Therefore, the visibility of the sign surface is ensured. Further, in terms of the sings, a light source for blinking, which has been conventionally required in the light transmitting type sign, is not necessary, which is advantageous in suppressing an increase in cost of providing the sign.

The first light source and the second light source are not intended to be limited to the RGB full-color LED and the blue-yellow-based pseudo-white LED described above. As long as both light sources have the same or substantially the same color temperature but different spectral characteristic levels in a predetermined wavelength region, these light sources can be applied as the first light source and the second light source. In this case, the wavelength region with different spectral characteristics can be suitably determined in accordance with the color of an illumination object. Further, a laser light source can be used as the first and second light sources described above. In this case, the blinking state of the sign surface to be illuminated can be made to be clearer.

In the above embodiment, the first light source and the second light source are configured to emit a first light and a second light with different spectral characteristics. That is, the first light source and the second light source are provided as different types of light-emitting elements. However, when the first light and the second light with different spectral characteristics are irradiated to the illumination object, the first light and the second light with different spectral characteristics may be obtained by using the same type of light-emitting elements as the first light source and the second light source and passing the light through an optical element (filter or the like). In this case, the optical element for obtaining the first light and the second with different spectral characteristics is considered as a part of the corresponding light source.

The sign pattern of the sign surface to be illuminated is configured to exhibit the colors of the wavelength region in which spectral characteristics in the first light source and the second light source are different. In this way, the sign pattern can be visually recognized as if it blinks in accordance with the alternate lighting of the first light source and the second light source.

In the above embodiment, the first light source and the second light source are alternately turned on. However, it is sufficient that the object is alternately illuminated. For example, each of the first light source and the second light source may be continuously turned on and the light emitted from each light source may be alternately blocked by a light-shielding member.

In the above embodiment, a lighting device for a road sign and a lighting lamp for a motor vehicle have been illustrated. However, the present invention is also applicable to a lighting device for illuminating a signboard or an advertisement, or a lighting device for illuminating a poster or other printed materials, or the like.

This application is based upon Japanese Patent Application No. 2014-164757 filed on Aug. 13, 2014, and the contents of which are incorporated herein by reference.

The invention claimed is:

1. A lighting system comprising:
   a first LED light source configured to emit a first light;
   a second LED light source configured to emit a second light; and
   a lighting control unit configured to control the first LED light source and the second LED light source,
   wherein the first light and the second light have substantially the same color temperature but different spectral characteristics,
   wherein the lighting control unit controls the lighting system such that the first light and the second light are alternately irradiated to an illumination object at an alternating frequency in a range of 2 to 4 Hz,
   wherein the lighting control unit controls the first LED light source and the second LED light source to each blink such that a combined luminous intensity of the first light and the second light is constant when the first light and the second light are alternatively irradiated to the illumination object,
   wherein the first LED light source and the second LED light source are fixed externally to the illumination object,
   wherein the illumination object is a road sign, and
   wherein the lighting system is mounted on a vehicle and configured such that the first light and the second light are irradiated to at least a front of the vehicle.

2. A lighting device, comprising:
   two vehicle lamps, each of the vehicle lamps including
      a high beam lamp;
      a low beam lamp; and
      a clearance lamp, including
         a first light source configured to emit a first light;
         a second light source configured to emit a second light; and
   at least one lighting control unit configured to control the first light source and the second light source of the vehicle lamps,
   wherein the first light and the second light have substantially the same color temperature but different spectral characteristics, and
   wherein the at least one lighting control unit controls the lighting device such that the first light and the second light are alternately irradiated at an alternating frequency in a range of 2 to 4 Hz,
   wherein each of the vehicle lamps is mounted on a vehicle and configured such that the first light and the second light are irradiated to at least a front of the vehicle,
   wherein the vehicle lamps are respectively arranged on a left side and a right side of a front portion of a vehicle body, and
   wherein the at least one lighting control unit controls the first light source and the second light source to each blink such that a combined luminous intensity of the first light and the second light is constant when the first light and the second light are alternatively irradiated to the illumination object.

3. The lighting system according to claim 1, further comprising:
   an illumination object that receives the first light and the second light, wherein the illumination object includes a first portion of a first color and a second portion of a second color, wherein the first color is different than the second color.

4. The lighting system according to claim 1, wherein the first light has three peaks in a range of 400 nm to 700 nm, and the second light has only two peaks in the range of 400 nm to 700 nm.

5. The lighting device according to claim 2, wherein the first light has three peaks in a range of 400 nm to 700 nm, and the second light has only two peaks in the range of 400 nm to 700 nm.

6. The lighting system according to claim 1, wherein the first light and the second light have a color temperature corresponding to white.

7. The lighting device according to claim 2, wherein the first light and the second light have a color temperature corresponding to white.

8. The lighting system according to claim 1, wherein the first LED light source is an RGB LED, and the second LED light source is a blue-yellow LED.

* * * * *